United States Patent
Craft

(10) Patent No.: US 7,171,563 B2
(45) Date of Patent: Jan. 30, 2007

(54) METHOD AND SYSTEM FOR ENSURING SECURITY OF CODE IN A SYSTEM ON A CHIP

(75) Inventor: David John Craft, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 10/439,041

(22) Filed: May 15, 2003

(65) Prior Publication Data

US 2004/0230818 A1    Nov. 18, 2004

(51) Int. Cl.
*G06F 1/24* (2006.01)

(52) U.S. Cl. .................. 713/182; 713/189; 713/193

(58) Field of Classification Search ............... 713/182, 713/189, 193
See application file for complete search history.

(56) References Cited

U.S. PATENT DOCUMENTS

| | | | |
|---|---|---|---|
| 4,713,753 A * | 12/1987 | Boebert et al. ............ 711/164 |
| 5,018,096 A * | 5/1991 | Aoyama .................... 711/164 |
| 5,355,413 A | 10/1994 | Ohno |
| 5,648,648 A * | 7/1997 | Chou et al. ................ 235/382 |
| 5,692,199 A | 11/1997 | Kikinis et al. |
| 5,724,423 A | 3/1998 | Khello |
| 5,805,880 A | 9/1998 | Pearce et al. |
| 5,963,142 A | 10/1999 | Zinsky et al. |
| 5,987,133 A | 11/1999 | Aisaka |
| 6,009,520 A | 12/1999 | Gharda |
| 6,138,236 A | 10/2000 | Mirov et al. |
| 6,141,752 A | 10/2000 | Dancs et al. |
| 6,145,085 A | 11/2000 | Tran et al. |
| 6,160,903 A * | 12/2000 | Hamid et al. ............... 382/115 |
| 6,185,678 B1 | 2/2001 | Arbaugh et al. |
| 6,226,742 B1 | 5/2001 | Jakubowski et al. |
| 6,263,431 B1 | 7/2001 | Lovelace et al. |

(Continued)

FOREIGN PATENT DOCUMENTS

WO    WO 01/57657 A1    8/2001

OTHER PUBLICATIONS

"Secure Remote Configuration for Networked Computer Systems"; IBM Technical Disclosure Bulletin; Jan. 1998; vol. 41, No. 01; pp. 653-655.

(Continued)

*Primary Examiner*—Thomas Peeso
(74) *Attorney, Agent, or Firm*—Stephen J. Walder, Jr.; Diana R. Gerhardt; Robert M. Carwell

(57) ABSTRACT

The present invention provides for validating downloaded code. Code is transferred to a volatile memory of a system on a chip from a source. The volatile memory is decoupled from the source of the transferred code through employment of an isolation bus. An embedded security value, associated with the downloaded code, is determined. The security value is compared to an unlock sequence stored within the non-volatile memory in the system on a chip. If the security value matches the unlock sequence, the downloaded code is allowed access to secure data stored in the non-volatile memory. If the security value does not match the unlock sequence, the downloaded code is denied access to the secure data stored in the non-volatile memory.

22 Claims, 2 Drawing Sheets

U.S. PATENT DOCUMENTS

| | | |
|---|---|---|
| 6,327,652 B1 | 12/2001 | England et al. |
| 6,823,463 B1 | 11/2004 | Challener et al. |
| 6,892,305 B1 | 5/2005 | Dayan et al. |
| 6,918,036 B1 | 7/2005 | Drews |
| 2001/0013098 A1 | 8/2001 | Angelo et al. |
| 2003/0074548 A1 | 4/2003 | Cromer et al. |
| 2003/0079132 A1 | 4/2003 | Bryant |
| 2003/0200454 A1 | 10/2003 | Foster et al. |
| 2003/0229777 A1 | 12/2003 | Morais |
| 2004/0103291 A1 | 5/2004 | Craft |
| 2005/0138270 A1 | 6/2005 | Morais |

OTHER PUBLICATIONS

U.S. Appl. No. 09/679,333, filed Oct. 4, 2000, Hepper et al.

Guendouz et al., "Rapid Prototype of a Fast Data Encryption Standard With Integrity Processing for Cryptographic Applications", IEEE (ISBN 0-07803-4455-3); May-Jun. 1998, vol. 6, pp. 434-437.

Schneir, B., "Protocols, Algorithms, and Source Code in C", Applied Cryptography, Second Edition; 1996; pp. 3-31, 38-40, 76, 107, 165-166, 351-355, 428-459; John Wiley & Sons, Inc.

\* cited by examiner

METHOD AND SYSTEM FOR ENSURING SECURITY OF CODE IN A SYSTEM ON A CHIP

CROSS-REFERENCED APPLICATION

This application is related to U.S. patent application Ser. No. 10/302,447, filed on Nov. 21, 2002, entitled "HARDWARE-BASED SECURE CODE AUTHENTICATION," which has an inventor in common, Mr. David Craft.

TECHNICAL FIELD

The invention relates generally to validating code and, more particularly, to validating code that has been downloaded to a system on a chip.

BACKGROUND

Code downloads are often performed in a system on a chip (SoC) environment. In the code download, program code and data can be transferred to the SoC from an outside source. There are a number of reasons why a code download can be performed. For instance, within the SoC, the code download could be performed due to such factors as updating code on the SoC, sending particular parameters to code already running in the SoC, and so on. Furthermore, it is possible that the volatile memory storage in the SoC does not have enough memory space to run the entire desired program.

Ensuring data security is an important design consideration of SoC architecture. In certain circumstances, an unauthorized third party can attempt to record or otherwise intercept sensitive data stored within the SoC, thereby either decreasing the commercial value of the data, or otherwise comprising the security of the SoC.

The interception can occur when the third party substitutes code to gain access to sensitive code that is stored within the SoC. This interception can occur during the reception of code or the processing of code by the SoC. The sensitive code stored within the SoC could contain a decryption key, which the unauthorized third party might try to copy or otherwise access through use of altered downloaded code.

Therefore, what is needed is a method and system for ensuring that such code downloaded into an SoC or other processing device has not been modified.

SUMMARY OF THE INVENTION

The present invention provides for validating downloaded code. Code is transferred to a volatile memory from a source. The volatile memory is decoupled from the source of the transferred code. An embedded security value, associated with the downloaded code, is determined. The security value is compared to an unlock sequence. If the security value matches the unlock sequence, the downloaded code is allowed access to secure data. If the security value does not match the unlock sequence, the downloaded code is denied access to the secure data.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
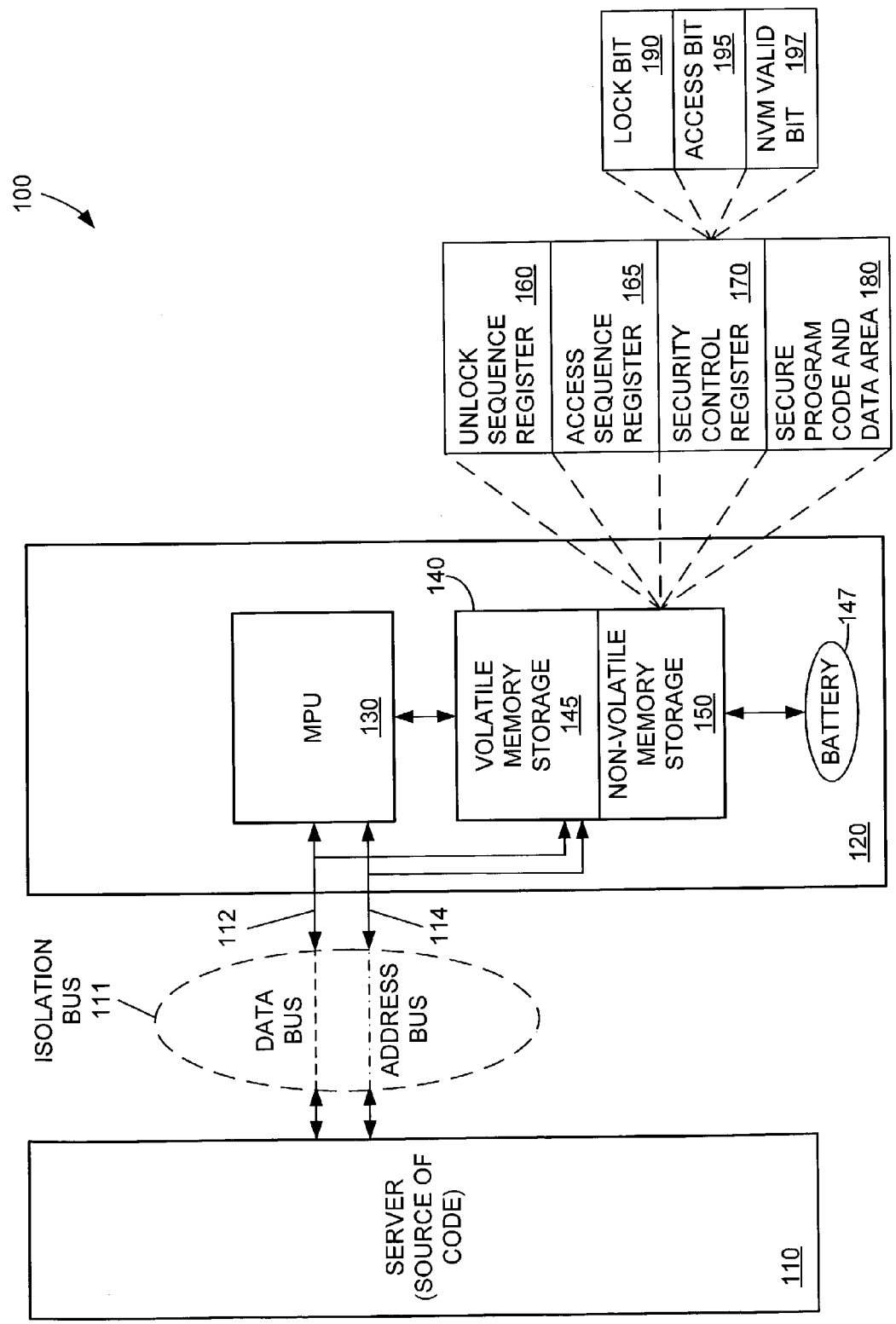
FIG. 1 schematically depicts a SoC having a non-volatile memory (NVM) storage area for comparing downloaded code to an unlock sequence.

Turning to FIG. 1, disclosed is a system 100. The system 100 comprises a source of code 110, such as an external NV memory, or conventional volatile memory which has been loaded from some form of Input/Output storage device, such as a disk or tape drive, or over a network or other communications link connected to a server or other source. The system 100 further comprises an isolation bus 111. The isolation bus 111 comprises a data bus 112 and an address bus 114 coupleable to the source 110. The data bus 112 and the address bus 114 are also coupled to an SoC 120. The data bus 112 and the address bus 114 of the isolation bus 111 can be disconnected between the SoC 120 and the server 110.

The SoC 120 comprises an MPU 130 that is coupled to the data bus 112 and the address bus 114. Both busses 112, 114 and the MPU 130 are coupled to a memory storage area 140. Memory storage area 140 has a volatile memory storage area 145 and a non-volatile (NV) memory storage area 150. In one embodiment, the NV memory 150 can be constructed from conventional volatile memory coupled to a battery 147, so that the NV memory 150 retains its information when power, such as the battery 147, is removed.

When code is downloaded from the server 110 to the volatile memory 145 of the SoC 120, the SoC 120 validates the code to ensure that the code is the correct code. During the validation process, the SoC 120 and the server 110 and/or the source memory, as appropriate, are disconnected from one another through disconnecting the data bus 112 and address bus 114 of the isolation bus 111. The isolation helps to ensure that indicia of the code validation process are not transmitted back across the data bus 112 and the address bus 114, as this indicia could be useful to an unauthorized third party wishing to have more information concerning confidential code stored within the SoC 120.

The NV memory 150 has an unlock sequence register 160, an access sequence register 165, a security control register (SCR) 170, and secure code and data area (secure area) 180. The SCR 170 has a lock bit 190, an access bit 195, and an NV memory valid bit 197. Generally, the SCR 170 stores indicia of interactions between embedded security values within the downloaded code and the various security procedures used to validate the downloaded code by the SoC 120. The SCR 170 further stores indicia of the status of the unlock sequence register 160 itself. In other words, the SCR 170 stores indicia of whether the unlock sequence has been accurately and completely stored within the unlock sequence register 160.

Generally, the SoC 120 stores downloaded code from the server 110 in the volatile memory storage 145. After isolation from the server 110 has occurred, a comparison occurs between security values associated with the downloaded code in volatile memory 145 to a series of bits, an "unlock sequence," within the unlock sequence register 160 of the NV memory 150. The unlock sequence register 160 contains a series of stored bits. If the embedded security value or values match the sequence of stored bits in the unlock sequence register 160, the downloaded code is validated. The downloaded code can then access the secure area 180 within the NV memory 150, subject to whatever other security precautions are instigated within the SoC 120. However, if there is a security value associated with part of the downloaded code that does not match the sequence of bits in the unlock sequence register 160, the code is denied access to the secure area 180.

The unlock sequence register 160 and the secure area 180 can be set within the NV memory 150. The unlock sequence within the NM memory 150 can be created in e-fuses, or with some other non-volatile memory element. The values of the e-fuses can be set during manufacturing. Furthermore, the secure area 180 can also be programmed into the SoC 120 during the manufacturing process.

Comparing security values associated with the downloaded code in the volatile memory 145 to the unlock sequence in the unlock sequence register 160 ensures that, before accessing the secure area area 180 (which may be, for instance, a decryption key), the code in the volatile memory 145 is given permission to access the secure code and data 180.

The results of the comparison between the unlock sequence in the unlock sequence register 160 and the appropriate values embedded in the stored suspect code in the volatile memory 145 are calculated and then stored in the SCR 170. The SCR 170 comprises a lock bit 190. Security values embedded in the suspect code are then parsed or otherwise derived from the suspect code and compared with the unlock sequence stored in the unlock sequence register 160. If it is found that the security value is equivalent to the unlock sequence, then the next code security value is derived from the downloaded code in the volatile memory 145 and compared to the next sequence of values in the unlock sequence register 160. This comparison continues until all of the sequence in the unlock sequence register 160 are compared to the downloaded code.

If all of the security values associated with the downloaded code are compared, and they all pass confirmation by the unlock sequence register, lock bit 190 is set to "unlock" and the secure data 180 can be read by the stored code, assuming that the access bit 195 is also set to "access." However, if the security values associated with the downloaded code are not equivalent to the unlock sequence, the code is "suspect," and the lock bit 190 is set to "lock" so that any downloaded code cannot have access to the secure area in the secure code and data area 180 until the lock bit 190 is reset. Forcing the validation of security values in downloaded code by an unlock code sequence, especially in combination with a timed or other locking of secure data 180, can significantly decrease the odds of an unauthorized third person gaining access to the secure data.

In one embodiment, once the comparison sequence is started, the comparison sequence should be completed before other actions are taken by the SoC 120. If the completion does not occur, the lock bit 190 is set to deny access of the downloaded code to the secure area area 180. A time-out period can be employed, wherein the comparison between the discerned security values associated with the downloaded code and the bits of the unlock sequence register 160 are to be completed within a certain time frame. If the validation is not performed within this time frame, the lock bit 190 is set to lock, and the downloaded code is locked from reading the secure area 180.

In one embodiment, the reset of the lock bit 190 can only occur at instigation of the original manufacturer, or only by some authorized person or enterprise. In yet another embodiment, the lock bit 190 has an associated "reset" time, such as associated with the decay-time of a capacitor, and a code sequence can only be tried after the reset time, such as half an hour.

In the system 100, whenever the NV memory storage 150 loses the stored non-volatile values, such as the bit sequence in the unlock sequence register 160, or the NV memory storage 150 has otherwise not been properly set, a non-volatile memory valid bit 197 can be set. If the non-volatile valid bit 197 is set, the unlock sequence will not run until the non-volatile valid bit 197 is reset. The resetting of the NVM valid bit 197 can done by the manufacturer, and so on.

Once the non volatile data "unlock sequence" that has been stored in the volatile memory 145 is deemed acceptable (for example, it is ensured that the information in the new NV memory storage 150 is complete and that it has not been tampered with), the unlock sequence can be compared to security values embedded within the source code stored in the volatile memory storage 145.

In a further embodiment, the unlock sequence in non-volatile memory 150 is stored with the aid of a battery 147. When the battery 147 has continuously applied power to the NV memory 150, the NV memory 150 values continue to be valid. The NVM valid bit 197 indicates that the values in the NV memory 150 are still valid, and the comparison between information associated with the downloaded code and information in the NV memory 150 can continue. However, if the battery 147 discharges, or the connection to the battery 147 is otherwise interrupted, then the NV memory 150 loses the unlock sequence in the unlock sequence register 160. Therefore, the new unlock sequence register values have to be stored in the unlock sequence register 160, and the NVM valid bit 197 is set so as to not allow the downloaded code to be validated by the unlock sequence register 160.

In a further embodiment, the lock bit 190 only grants access to a portion of the secure data 180. This can be a function of the particular security values embedded within the code sequence stored in the unlock sequence register 160.

In a further embodiment, the SCR 170 also employs the access sequence register 165. The access sequence register 165 has stored within access control bits. Generally, access control bits are used to perform security tests on the downloaded code directly, as opposed to security values embedded within or associated with the downloaded code. If the functions performed within the access sequence register 165 indicate that the downloaded code is incorrect, the access bit 195 is set. If the access bit 195 is set, the downloaded code within the volatile memory 145 cannot access the secure area 180.

Figure 2:
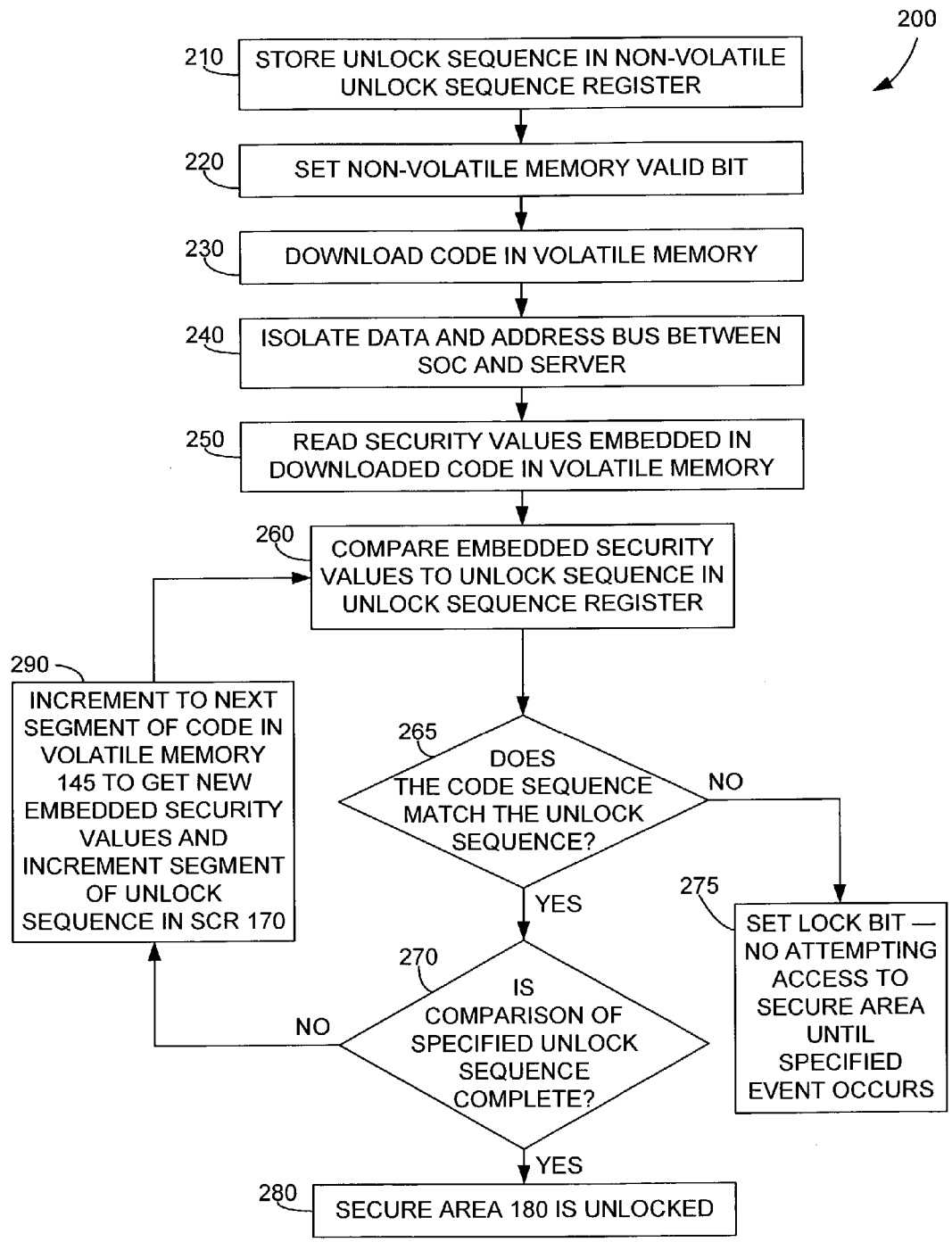
FIG. 2 illustrates a method for ensuring the security of downloaded code in a SoC.

Turning now to FIG. 2, disclosed is a method 200 for validating embedded security values within downloaded code. In step 210, an unlock sequence is stored within the unlock sequence register 160. In step 220, the NVM valid bit 197 is set to indicate that the unlock sequence has been successfully stored in the unlock sequence register 160. In one embodiment, the NV memory 150 is alterable, such as battery-powered static random access memory (SRAM), and the information within the security control register 170 is stored in the NV memory 150. In another embodiment, the NV memory 150 is not alterable, such as e-fuses, and the information within the SCR 150 is stored in the volatile memory storage 145.

In step 230, code is downloaded into the volatile memory storage 145. In step 240, the server 110 and the SoC 120 decouple and isolate. In step 250, embedded security values are read from the downloaded code stored in the volatile memory 145.

In step 260, embedded security values are compared to at least part of the unlock sequence in the unlock sequence register 160. In step 265, it is determined whether there is a match between the security values embedded within the downloaded code and the unlock sequence in the unlock sequence register 160.

In step 275, if the security values and the unlock sequence do not match, then the lock bit 190 indicates that there can be no further access to the unlock sequence in the unlock sequence register 160 until a specified event occurs. This specified event can be a lapse of time, a reset of the lock bit 190 by the manufacturer or other authorized entity to reset the lock bit 190, and so on.

However, in step 270, if the embedded security values match the unlock sequence, it is determined whether the comparison is complete. If the comparison is not complete, then in step 290, the embedded security values are read out of the next segment of downloaded code, and the comparison within step 260 begins again. However, if the comparison is complete, the secure area 180 is unlocked, and the downloaded code can employ the code and data within the area 180. In a further embodiment, the unlocking of the secure code and data area 180 is contingent upon access being granted as indicated by the status of the access bit 195.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for validating downloaded code, comprising:
   transferring code to a volatile memory;
   decoupling the volatile memory from the source of the transferred code;
   determining an embedded security value associated with the downloaded code;
   comparing the security value to an unlock sequence; and
   if the security value matches the unlock sequence, allowing the downloaded code access to secure area; and
   if the security value does not match the unlock sequence, denying the downloaded code access to the secure area, wherein decoupling the volatile memory from the source of the transferred code further comprises decoupling at least one of a data bus or an address bus.

2. The method of claim 1, further comprising storing the unlock sequence within an unlock sequence register.

3. The method of claim 2, further comprising setting the non-volatile validation bit after storing the unlock sequence.

4. The method of claim 2, further comprising setting a lock bit if the embedded security value does not match the unlock sequence.

5. The method of claim 1, wherein decoupling the volatile memory from the source of the transferred code comprises decoupling a data bus.

6. The method of claim 1, wherein decoupling the volatile memory from the source of the transferred code comprises decoupling an address bus.

7. The method of claim 4, further comprising resetting the lock bit after at least a pre-defined period of time has passed.

8. A data receiver for validating downloaded code, comprising: an isolation bus;
   a volatile memory storage area coupled to the isolation bus;
   a non-volatile storage area coupled to the volatile memory storage area, having:
      an unlock sequence register;
      a lock bit; and
      secure information.

9. The system of claim 8, wherein the isolation bus comprises at least part of an address bus.

10. The system of claim 8, wherein the isolation bus comprises at least part of a data bus.

11. The system of claim 8, wherein the lock bit is contained within a security control register.

12. The system of claim 8, further comprising a non-volatite memory valid bit.

13. The system of claim 12, wherein the non-volatile memory valid bit is contained within a security control register.

14. The system of claim 8, wherein the unlock sequence register contains an unlock sequence.

15. The system of claim 8, further comprising a battery coupled to the non-volatile memory storage.

16. The system of claim 8, further comprising a server coupled to the isolation bus.

17. The system of claim 8, wherein the data receiver comprises a system on a chip.

18. The system of claim 8, wherein the secure information comprises a decryption key.

19. The system of claim 8, wherein the secure information comprises secure data.

20. The system of claim 8, wherein the secure information comprises secure program code.

21. A computer program product for validating downloaded code, the computer program comprising:

computer code for transferring code to a volatile memory;

computer code for decoupling the volatile memory from the source of the transferred code;

computer code for determining an embedded security value associated with the downloaded code;

computer code for comparing the security value to an unlock sequence; and if the security value matches the unlock sequence, computer code for allowing the downloaded code access to the secure area; and if the security value does not match the unlock sequence, computer code for denying the downloaded code access to the secure area, wherein the computer code for decoupling the volatile memory from the source of the transferred code decouples at least one of a data bus or an address bus.

22. A processor for validating downloaded code, the processor including a computer program comprising:

computer code for transferring code to a volatile memory;

computer code for decoupling the volatile memory from the source of the transferred code;

computer code for determining an embedded security value associated with the downloaded code;

computer code for comparing the security value to an unlock sequence; and if the security value matches the unlock sequence, computer code for allowing the downloaded code access to the secure area; and if the security value does not match the unlock sequence, computer code for denying the downloaded code access to the secure area, wherein the computer code for decoupling the volatile memory from the source of the transferred code decouples at least one of a data bus or an address bus.

\* \* \* \* \*